(No Model.)

W. J. BRIDGES.
NUT LOCK.

No. 578,203. Patented Mar. 2, 1897.

WITNESSES:
C. E. Erickson
Edwin Carlson

INVENTOR:
William J. Bridges
BY his ATTORNEY:
A. M. Carlsen

UNITED STATES PATENT OFFICE.

WILLIAM JAMES BRIDGES, OF INDIANAPOLIS, INDIANA.

NUT-LOCK.

SPECIFICATION forming part of Letters Patent No. 578,203, dated March 2, 1897.

Application filed February 24, 1896. Serial No. 580,391. (No model.)

*To all whom it may concern:*

Be it known that I, WILLIAM JAMES BRIDGES, a citizen of the United States, residing at Indianapolis, in the county of Marion and State of Indiana, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in nut-locks, and is especially adapted for use on the bolts by which the sections of railroad-tracks are secured together.

The object of my invention is to provide a comparatively cheap and perfectly-safe nut-lock. This object I attain by the novel construction and arrangement of parts illustrated in the accompanying drawings, in which—

Figure 1:
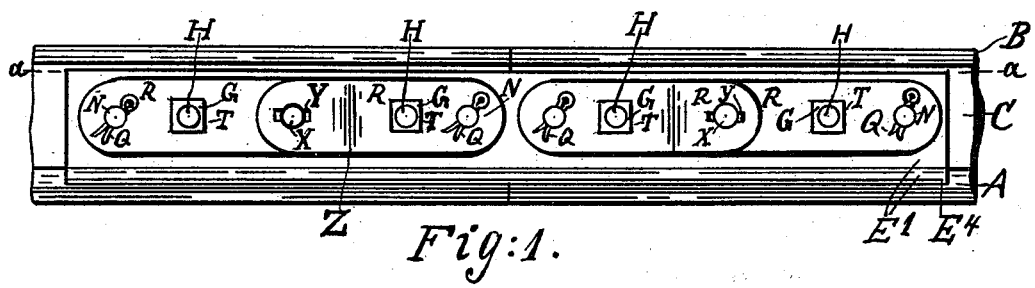
Figure 2:
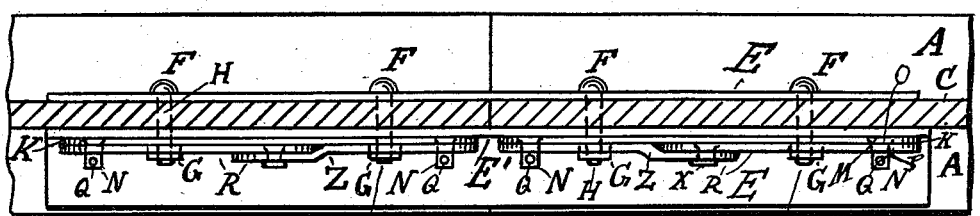
Figure 3:
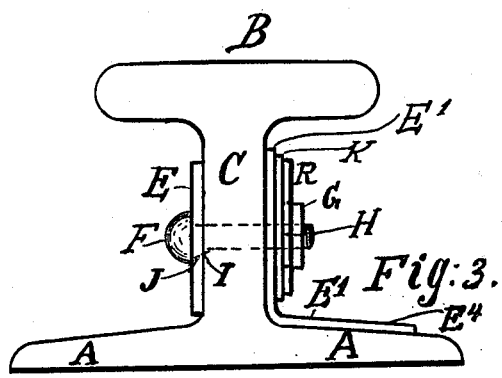

Figure 1 is a side elevation of track-joint with my nut-lock applied to the nuts of its bolts. Fig. 2 is a sectional top view of Fig. 1, as on the line $a\ a$. Fig. 3 is an enlarged end view of a track-rail having my nut-lock applied on it.

Referring to the various parts by letters of reference, A designates the bottom flanges, B the top, and C the center rib, of a railway-rail.

E is the common fish-plate, by which the rails are joined together.

E' is the style of fish-plate made with an angularly-bent flange $E^4$, resting upon the bottom flange of the rail.

F are the heads, and G the nuts, of common rail-bolts H, passed through the two fish-plates and the intervening rail. These bolts are provided near their heads with a projection which takes hold in a notch, as usual in the fish-plate nearest the bolt-head.

Between the nut and the fish-plate nearest to it I provide a washer-plate or an elongated washer K, provided with a hole which slips loosely over the bolts before the nuts are put on. It also has in other holes M loosely inserted the pins N, having a thin head O, turned toward the rail, and a transverse hole P in the other end, through which I insert a locking spring-pin Q in front of the nut-locking plate R, which is provided with the hole S, fitting upon the pins N, and the holes T, fitting upon and holding the nuts so they cannot turn. The holes T may of course be of square, hexagon, or any other shape to fit the nut used. It will thus be seen that the washer-plate K is held by the bolts and the nuts against the fish-plate, and the nut-locking plate is secured upon the pins N by the spring-pin Q, which, when spread as shown in Fig. 1, renders it impossible for any part of the locking means to get loose by the jarring of the rail when trains run over it.

It is obvious that modifications of style and size belong to this invention as a part of it. Its adaptability for cross-joints of rails, it is readily understood, depends simply on bending of the fish-plates and washer-plates and, if desired, also of the locking-plates to any desired angles.

In Figs. 1 and 2 is shown how the locking-plates may be pivotally secured together in pairs by a pin, as X, secured in one locking-plate and extending through the slotted hole Y of the next locking-plate, and has its head engaging the outer side of the latter, while the opposite ends of the locking-plates are held to the washer-plate by two of the pins N. In this instance the two nuts are locked by two locking-plates secured by two pins N and the pivot-rivet X, which help to prevent the adjacent ends of the locking-plate from being bent outward from the fish-plate. When the locking-plates are thus joined together by a slightly-adjustable joint, as shown, the outer one of the plates is preferably offset, as at Z, so as to fit both the fish-plate and the adjoining locking-plate. If so desired, the head O of the pivot-pin N may be countersunk into the washer-plate, as shown in Fig. 2.

The locking-plates, as well as the washer-plates, may be cast or stamped from wrought-iron very cheaply.

From the above description it will be seen that I provide a cheap but very reliable nut-lock capable of being used on one or more bolts at a time by a slight variation in the manufacture of the locks.

Having thus described my invention, what I claim, and desire to secure by Letters Patent, is—

A nut-lock, for the joints of railroad-tracks, consisting of the elongated washer-plate K, serving as washers on more than one of the rail-bolts; locking-plates pivotally and slidingly jointed together with their overlapping ends, independently of the washer-plate, and having their outer ends secured to the outer ends of the washer-plate by the locking-pins N, put loosely through the two plates, and the spring pins or keys Q, in the locking-pins, substantially as and for the purpose described.

In testimony whereof I affix my signature in presence of two witnesses.

WILLIAM JAMES BRIDGES.

Witnesses:
FREDRICK WEBER,
EDWARD H. DECKER.